(12) United States Patent
Lee et al.

(10) Patent No.: US 9,389,645 B2
(45) Date of Patent: Jul. 12, 2016

(54) TABLET PERSONAL COMPUTER WITH DETACHABLE AUXILIARY DEVICE

(71) Applicant: BLUEBIRD INC., Seoul (KR)

(72) Inventors: Jang Won Lee, Seoul (KR); Jung Sik Park, Namyangju-si (KR)

(73) Assignee: BLUEBIRD INC. (KR)

( * ) Notice: Subject to any disclaimer, the term of this patent is extended or adjusted under 35 U.S.C. 154(b) by 201 days.

(21) Appl. No.: 14/012,110

(22) Filed: Aug. 28, 2013

(65) Prior Publication Data

US 2014/0063735 A1    Mar. 6, 2014

(30) Foreign Application Priority Data

Aug. 31, 2012   (KR) .................. 10-2012-0096046

(51) Int. Cl.
| | |
|---|---|
| G06F 1/16 | (2006.01) |
| H05K 5/00 | (2006.01) |
| H05K 7/00 | (2006.01) |
| F16M 13/00 | (2006.01) |
| F16M 13/04 | (2006.01) |

(52) U.S. Cl.
CPC ............. *G06F 1/1656* (2013.01); *F16M 13/00* (2013.01); *F16M 13/04* (2013.01); *G06F 1/1626* (2013.01); *G06F 1/1628* (2013.01); *G06F 1/1633* (2013.01)

(58) Field of Classification Search
CPC ...... F16M 13/00; F16M 13/04; G06F 1/1628; G06F 1/1626; G06F 1/1633; G06F 1/1656
USPC .............. 361/679.01, 679.02, 679.55–679.59
See application file for complete search history.

(56) References Cited

U.S. PATENT DOCUMENTS

| | | |
|---|---|---|
| 6,717,801 B1 | 4/2004 | Castell et al. |
| 8,152,071 B2 | 4/2012 | Doherty et al. |
| 2002/0044406 A1 | 4/2002 | Shimoda et al. |
| 2010/0270345 A1 | 10/2010 | Keeskes |
| 2011/0297566 A1 | 12/2011 | Gallagher et al. |
| 2012/0050970 A1 | 3/2012 | Murakata et al. |

FOREIGN PATENT DOCUMENTS

| | | |
|---|---|---|
| JP | 2002312069 | 10/2002 |
| JP | 2012074021 | 4/2012 |
| WO | 2011156275 | 12/2011 |

OTHER PUBLICATIONS

European Search Report—European Application No. 13182343.7 issued on Oct. 28, 2014, US 2012/050970, Motorola Solutions, Inc.: "ET1 Enterprise Tablet Integrator Guide", 2011, US 2002/044406, US 2010/270345, Motorola Solutions, Inc.: "ET1 Enterprise Tablet User Guide", 2012 and US 2011/297566.
Motorola Solutions, Inc., ET1 Enterprise Tablet Integrator Guide, 2011.
Motorola Solutions, Inc., ET1 Enterprise Tablet User Guide, 2012.
European Office Action—European Application No. 13182343.7 issued on Oct. 1, 2015, U.S. Pat. No. 6717801.

*Primary Examiner* — Bernard Rojas
(74) *Attorney, Agent, or Firm* — Cantor Colburn LLP

(57) ABSTRACT

Disclosed is a tablet PC. The tablet PC includes a pad main body which includes an input portion for inputting predetermined data, and an output portion for outputting results corresponding to input data; a detachable auxiliary device which is detachably coupled to one side of the pad main body to assist functions of the pad main body; and a fastening unit which is provided in the pad main body and fastens the detachable auxiliary device to the pad main body. With this, it is possible to use various auxiliary functions such as convenience in mobility, physical distribution management, inventory control, payment, personal authentication, etc.

15 Claims, 10 Drawing Sheets

FIG. 5
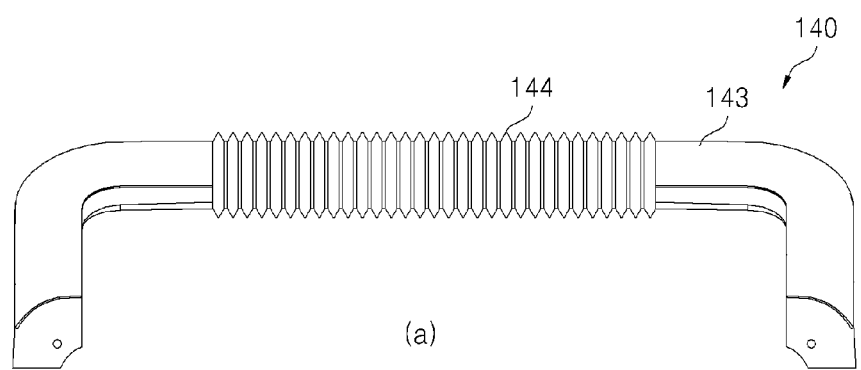
(a)
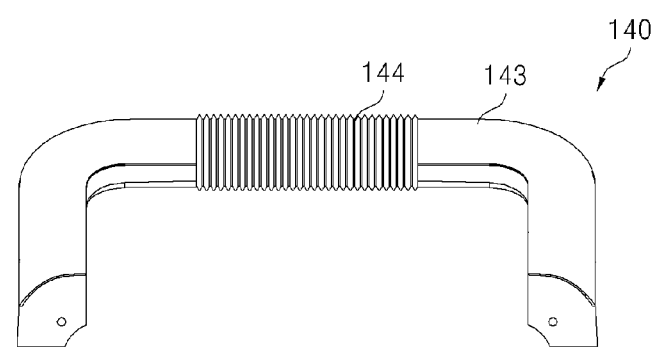
(b)

FIG. 7
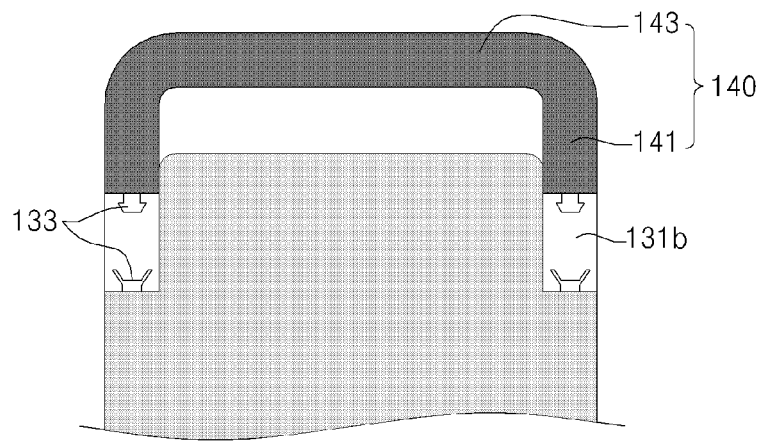
(a)
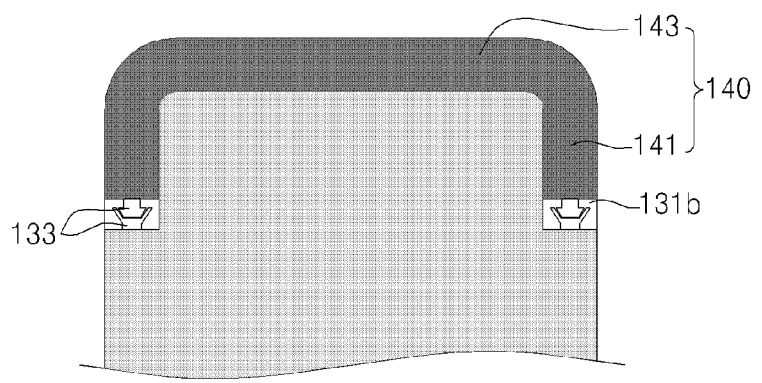
(b)

TABLET PERSONAL COMPUTER WITH DETACHABLE AUXILIARY DEVICE

CROSS-REFERENCE TO RELATED APPLICATIONS

This application claims the priority of Korean Patent Application No. 10-2012-0096046, filed on Aug. 31, 2012, in the Korean Intellectual Property Office, the disclosure of which is incorporated herein by reference.

BACKGROUND

The inventive concept relates to a tablet personal computer (PC), and more particularly to a tablet PC, in which functions related to a variety of work can be extended since a detachable auxiliary device for assisting a function of a pad main body is coupled to the pad main body.

In general, a tablet PC, which combines performance of a notebook computer and mobility of a personal digital assistant (PDA), is a computer that includes a display portion configured with a liquid crystal, an organic light emitting diode (OLED) or the like and uses a hand, a pen and digital ink as an input method instead of a keyboard and a mouse.

Further, the tablet PC, which is a personal computer generally controlled through a touch screen, has been in increasing demand by a student or a worker because it is easy to carry even though the tablet PC is less convenient in working than a net-book computer or a notebook computer.

Through the touch screen, such a tablet PC is often used in entertainment such as simple Internet search, view of a moving picture, reading, a game or the like, but has also been frequently used in education such as an electronic textbook or the like.

However, a conventional tablet PC disadvantageously has a limited function for use in an industrial purpose since it is mostly used for a personal or educational purpose. That is, there has been a problem that use of functions such as physical distribution management, inventory control, payment, personal authentication, etc. is limited in the conventional tablet PC.

Meanwhile, in the conventional tablet PC, a hand grip allowing a user to hold it with his/her hand is fixed to a main body of the tablet PC, and it is thus difficult to properly cope with various usage environments of the tablet PC.

PATENT REFERENCES

Reference

U.S. Pat. No. 8,152,071 (Apr. 10, 2012) (Motion Computing, Inc.)

SUMMARY OF THE INVENTION

The inventive concept provides a tablet PC which additionally has an auxiliary function to be used for an industrial purpose, and is capable of properly coping with various usage environments through a detachable hand grip.

According to an aspect of the inventive concept, there is provided a tablet personal computer (PC) comprising: a pad main body which comprises an input portion for inputting predetermined data, and an output portion for outputting results corresponding to input data; a detachable auxiliary device which is detachably coupled to one side of the pad main body to assist functions of the pad main body; and a fastening unit which is provided in the pad main body and fastens the detachable auxiliary device to the pad main body.

The detachable auxiliary device may comprise a detachable hand grip which is coupled to the pad main body with the fastening unit and gripped by a hand.

The detachable hand grip may be coupled to at least one side of the pad main body.

The pad main body may be shaped like a rectangular plate, and the detachable hand grip may be coupled to two corners combined among four corners of the pad main body.

The detachable hand grip may comprise: a pad coupling portion which is coupled to the pad main body; and a grip portion which is coupled to the pad coupling portion and gripped by a user with his/her finger.

The pad coupling portion may comprise an inclined portion inclined upward or downward at an angle previously determined with respect to the pad main body.

The inclined portion may have a curved shape.

The detachable hand grip may comprise a length adjusting portion for adjusting the length of the detachable hand grip to couple with different sides of the pad main body.

The length adjusting portion may have a corrugated structure.

The detachable hand grip may comprise an anti-slip portion for preventing slipping when gripped by a user.

The pad main body may comprise at least one corner finishing piece detachably coupled to a corner, and the fastening unit may comprise: a hand grip placement portion provided by separating the corner finishing piece, and placing the detachable hand grip therein; and a fastening member fastening the detachable hand grip to the pad main body.

The fastening unit may comprise: a hand grip placement portion provided inside the pad main body so that at least a part of the detachable hand grip can slide; an elastic member provided inside the pad main body and contacting the detachable hand grip so that the detachable hand grip can be elastically biased outward; and a locking unit provided in the pad main body and the detachable hand grip so that the detachable hand grip can be locked at a predetermined position of the pad main body.

The detachable auxiliary device may comprise a module installation unit coupled to the pad main body with the fastening unit and installed with at least one of a magnetic striped reader module for reading information recorded in a magnetic stripe, a bar code reader for recognizing a bar code, an integrated circuit (IC) card module for payment authentication or security-related authentication, and a preliminary battery module.

The fastening unit may comprise a module installation unit placement portion provided on a rear wall of the pad main body; and a fastening member fastening the module installation unit to the module installation unit placement portion of the pad main body.

The detachable auxiliary device may comprise a detachable hand strap changeable in an angle of the pad main body while being gripped.

The detachable hand strap may comprise a mounting portion mounted to the pad main body; a rotary portion coupled to the mounting portion and rotatable at one side of the mounting portion; and a connection ring portion coupled to the rotary portion and gripped by a user.

The rotary portion may have a circular section, serrated protrusions may be provided along a circular circumference of the rotary portion, the mounting portion may comprise protrusion engaging portions to be engaged with the serrated protrusions, and an angle of the pad main body in a gripped state may be changed by rotation of the rotary portion.

The detachable auxiliary device may further comprise a module installation unit which is coupled to the pad main body by the fastening unit and in which at least one module is installed among a magnetic stripe reader module configured to read information recorded in a magnetic stripe, a bar code reader module configured to recognize a bar code, an integrated circuit (IC) card module for payment authentication or security-related authentication, and a preliminary battery module, and the detachable hand strap is coupled to the module installation unit.

BRIEF DESCRIPTION OF THE DRAWINGS

Exemplary embodiments of the inventive concept will be more clearly understood from the following detailed description taken in conjunction with the accompanying drawings in which:

FIG. 5 is a view showing that a length adjusting portion is provided in the detachable hand in the tablet PC according to the first embodiment of the inventive concept;

FIG. 7 is a view showing that the detachable hand grip is coupled to the tablet PC by a push-latch button method according to the first embodiment of the inventive concept;

DETAILED DESCRIPTION OF THE INVENTION

Figure 1:
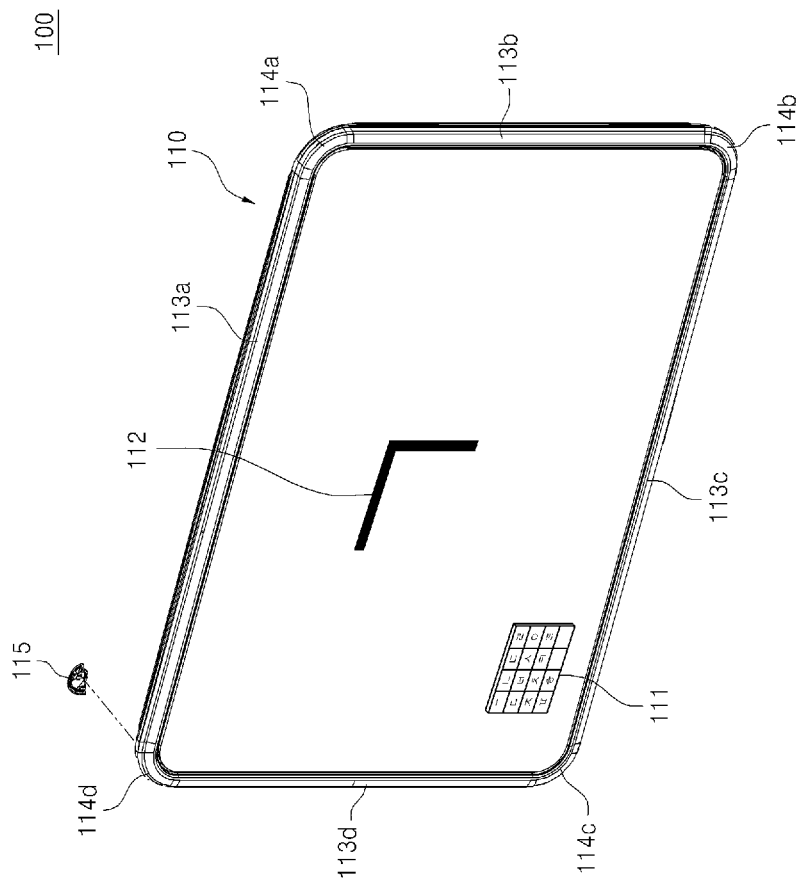
FIG. 1 is a front perspective view of a pad main body of a tablet PC according to a first embodiment of the inventive concept.

The attached drawings for illustrating embodiments of the inventive concept are referred to in order to gain a sufficient understanding of the inventive concept and the merits thereof.

Hereinafter, the inventive concept will be described in detail by explaining embodiments of the inventive concept with reference to the attached drawings. Like reference numerals in the drawings denote like elements.

Figure 2:
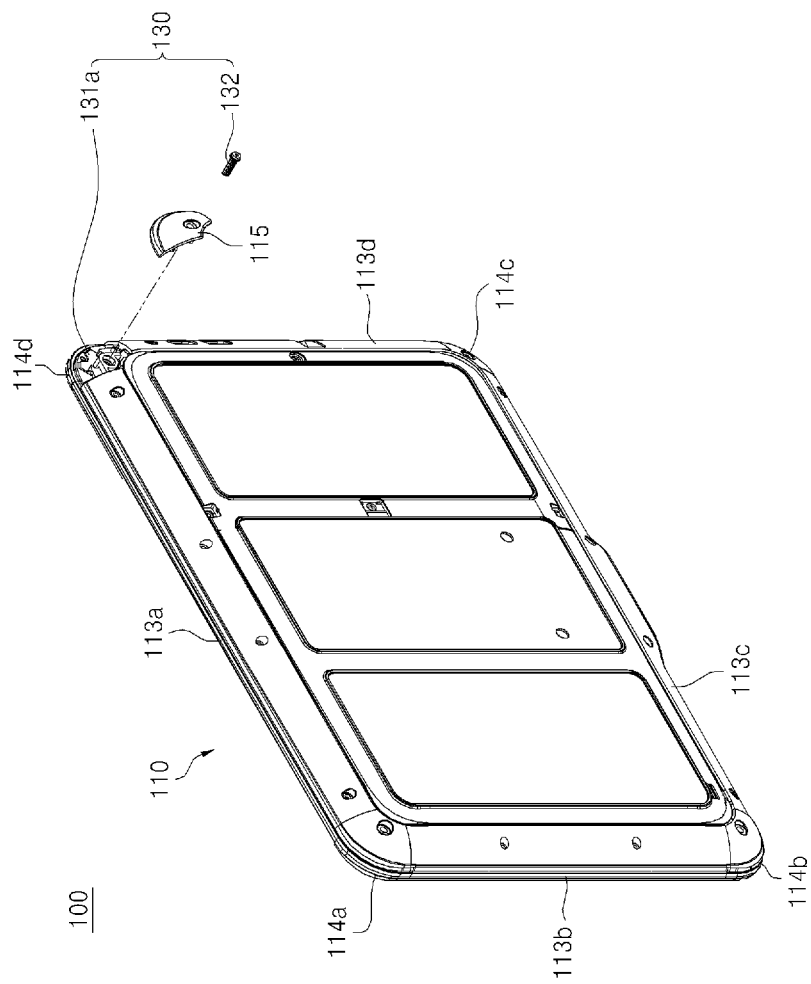
FIG. 2 is a rear perspective view of the pad main body of the tablet PC according to the first embodiment of the inventive concept.

FIG. 1 is a front perspective view of a pad main body of a tablet PC 100 according to a first embodiment of the inventive concept, and FIG. 2 is a rear perspective view of the pad main body of the tablet PC 100 according to the first embodiment of the inventive concept.

Referring to FIGS. 1 and 2, the pad main body 110 includes an input portion 111 for inputting predetermined data, an output portion 112 for outputting results corresponding to the input data.

Here, a user may input data to the input portion 111 with his/her fingers, a touch pen, etc., and the data input to the input portion 111 is processed in various internal processors of the pad main body 110 so that results corresponding to the input data can be output to the output portion 112.

Referring to FIGS. 3, 4, 8 and 9, a detachable auxiliary device 120 may be detachably coupled to one side of the pad main body 110 in order to assist functions of the pad main body 110.

Here, the detachable auxiliary device 120 may be provided as a detachable hand grip 140, a module installation strap 150 in which various modules for auxiliary functions are installed, or a detachable hand strap 160, which will be described later.

With this, the tablet PC 100 according to the inventive concept can support not only its own basic functions but also auxiliary functions.

Figure 8:
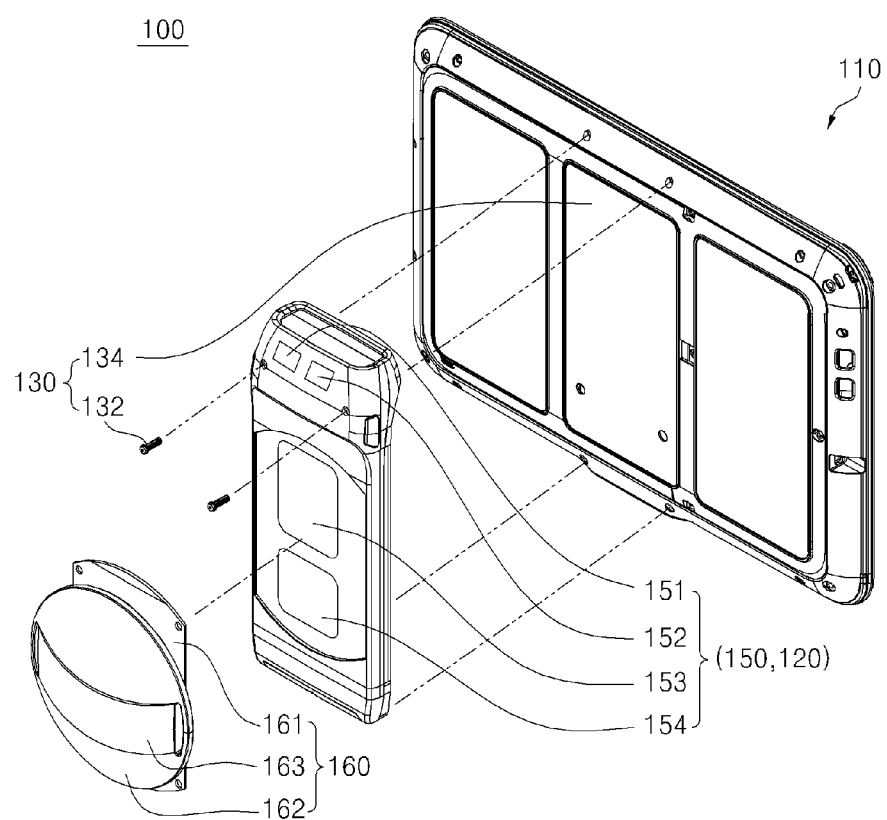
FIG. 8 is an exploded perspective view showing that a module installation unit and a detachable hand strap are all coupled to a pad main body in a tablet PC according to a second embodiment of the inventive concept.
Figure 9:
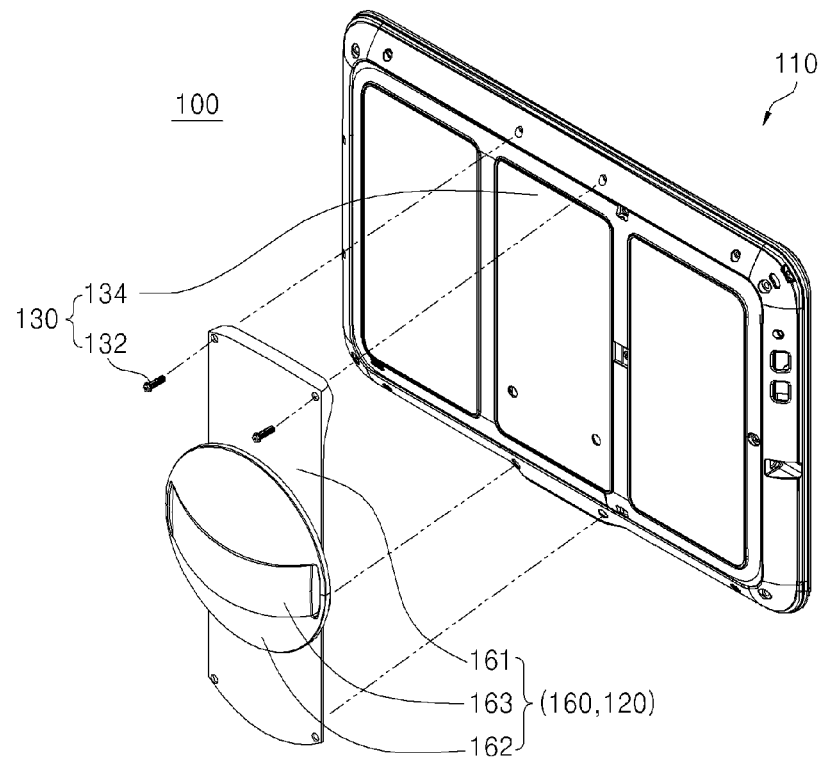
FIG. 9 is an exploded perspective view showing that only a detachable hand strap is coupled to a pad main body in a tablet PC according to a third embodiment of the inventive concept.

Referring to FIGS. 2, 8 and 9, a fastening unit 130 is provided in the pad main body 110 so that the detachable auxiliary device 120 can be coupled to the pad main body 110.

Meanwhile, the detachable auxiliary device 120 may include a shock absorber capable of absorbing a shock of the pad main body 110, Here, the shock absorber may include at least one of rubber, sponge, urethane, polystyrene and polyethylene.

Figure 3:
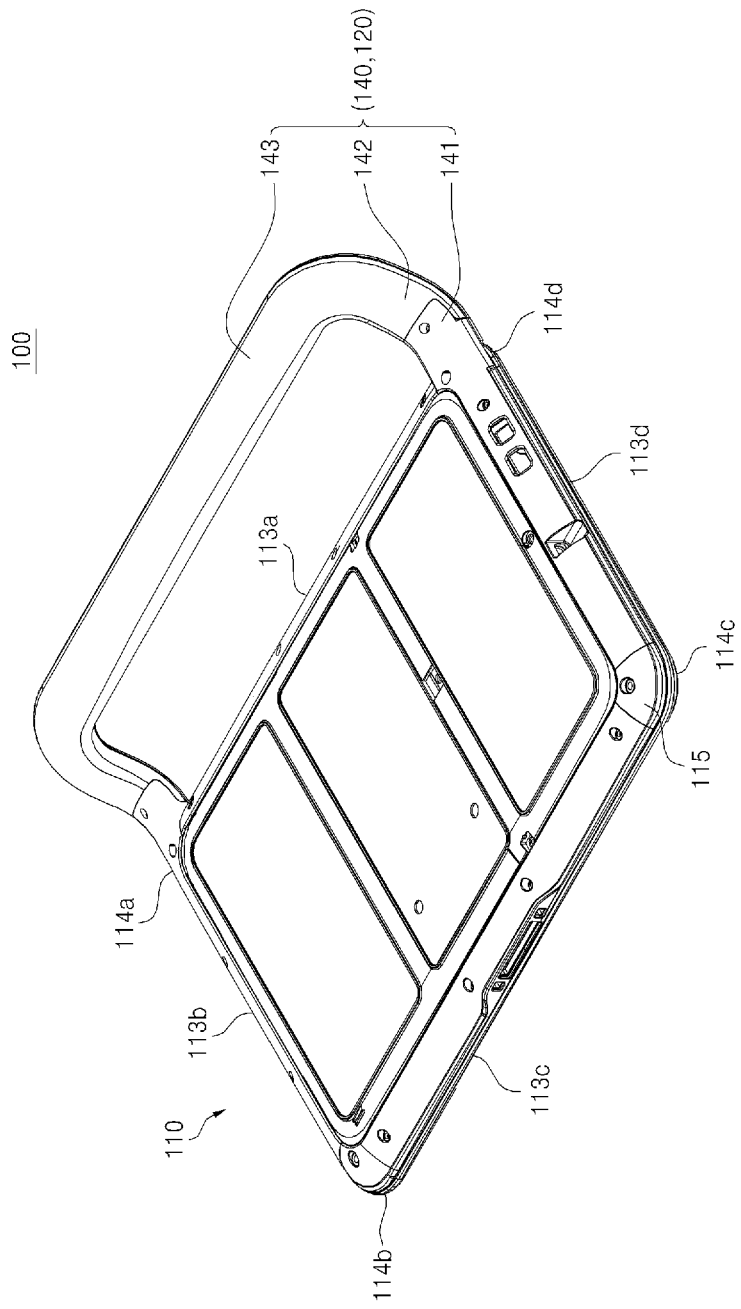
FIGS. 3 and 4 are a perspective view showing that a detachable hand grip is coupled to the pad main body of the tablet PC according to the first embodiment of the inventive concept.
Figure 4:
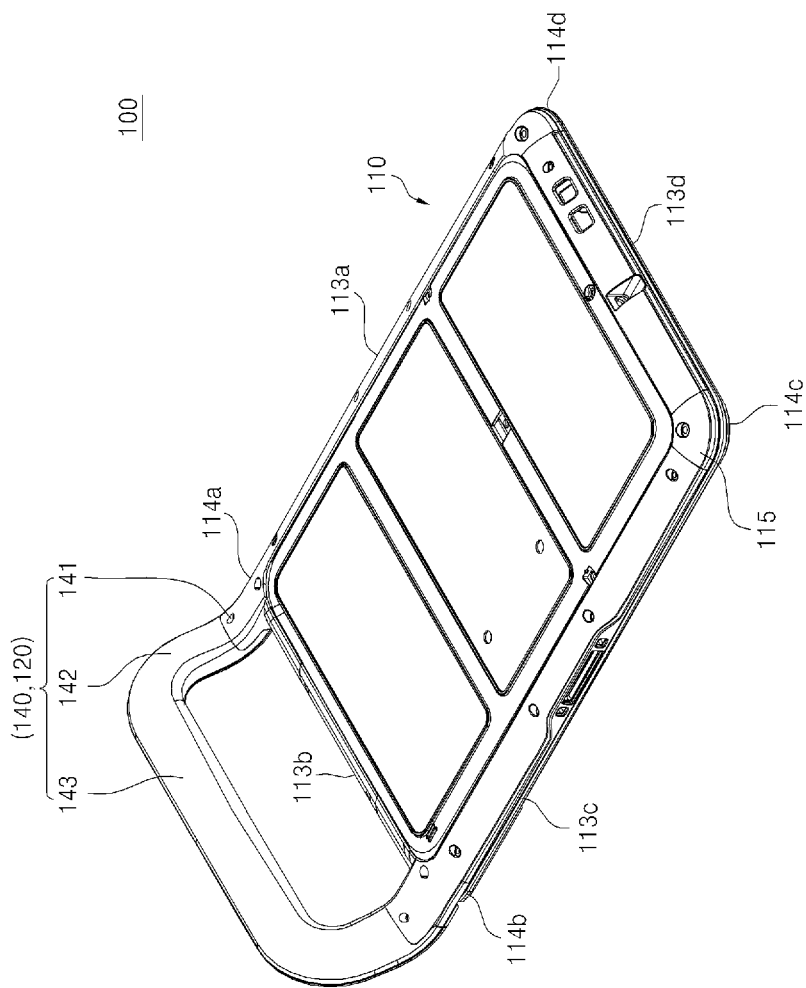

FIGS. 3 and 4 are a perspective view showing that a detachable hand grip is coupled to the pad main body of the tablet PC according to the first embodiment of the inventive concept.

In this embodiment referring to FIGS. 1 to 4, the detachable auxiliary device 120 is provided as the detachable hand grip 140 and coupled to the pad main body 110.

That is, the detachable auxiliary device 120 may be provided as the detachable hand grip 140 coupled to the pad main body 110 with the fastening unit 130 and gripped by a hand.

In general, when a user moves, s/he may grip the detachable hand grip 140 to carry the tablet PC 100. On the other hand, when a user uses the tablet PC 100, s/he may grip the detachable hand grip 140 to do various operations.

Here, in accordance with usage environments, the tablet PC 100 may be disposed in a landscape direction or a portrait direction.

Further, the tablet PC may have to be gripped selectively in the portrait direction or the landscape direction under various conditions that the tablet PC 100 is carried or used in a subway, a bus or the like where there are a lot of people.

However, the hand grip coupled to a conventional tablet PC is integrated with the main body, and therefore a user has to grip the hand grip in only one direction while using or carrying the tablet PC 100.

That is, in the conventional tablet PC, the hand grip is fixed to the main body, and it is therefore difficult to properly cope with various usage environments when using the tablet PC 100 or carrying the tablet PC 100.

However, in the tablet PC 100 according to the inventive concept, the hand grip is detachable so that the detachable hand grip 140 can be coupled to various parts of the pad main body 110.

With this configuration, the tablet PC 100 allows a user to easily grip the pad main body 110 regardless of whether its display is used in the landscape direction or the portrait direction, thereby having an effect on properly copping with various usage environments.

Here, the detachable hand grip 140 may be coupled to at least one side 113a, 113b, 113c or 113d of the pad main body 110. Here, the side refers to each segment of lines forming a polygon.

That is, the pad main body 110 is formed to have a plurality of sides. Here, parts of the detachable hand grip 140 may be coupled to the plurality of sides of the pad main body 110, respectively. Alternatively, parts of the detachable hand grip 140 may be coupled to a predetermined portion formed on one side of the pad main body 110.

Meanwhile, the pad main body 110 may be shaped like a rectangular plate. In this case, the detachable hand grip 140 may be coupled to two corners combined among four corners 114a, 114b, 114c and 114d of the pad main body 110. Here, the corner refers to an angular point where two edges of an object join as described above.

That is, as shown in FIG. 3, the detachable hand grip 140 may be coupled to two corners 114a and 114d formed at ends of a landscape directional side, or as shown in FIG. 4, the detachable hand grip 140 may be coupled two corners 114a and 114b formed at ends of a portrait directional side.

Although it is not shown, the detachable hand grip 140 may be coupled to two corners 114a and 114c formed at ends of a diagonal line of the pad main body 110.

With this configuration, the tablet PC 100 according to an embodiment of the inventive concept may couple with the detachable hand grip 140 in various directions, so that a user can easily grip the pad main body regardless of whether its display is used in the landscape direction or the portrait direction, thereby improving convenience.

Referring to FIGS. 2, 3 and 4, if the detachable auxiliary device 120 is provided as the detachable hand grip 140, the pad main body 110 includes at least one corner finishing piece 115 detachably coupled to the corners 114a, 114b, 114c and 114d.

Further, the fastening unit 130 is provided separately from the corner finishing piece 115, and includes a hand grip placement portion 131a in which the detachable hand grip 140 is placed, and a fastening member 132 for fastening the detachable hand grip 140 to the pad main body 110.

That is, the detachable hand grip 140 can be placed in a position where the corner finishing piece 115 coupled to the pad main body 110 is separated from the pad main body 110, that is, in the hand grip placement portion 131a.

Further, the detachable hand grip 140 may be coupled to the pad main body 110 by the fastening member 132 such as a screw, a bolt, etc.

Here, the hand grip placement portion 131a does not always couple with only the detachable hand grip 140, but may couple with various auxiliary devices such as a shoulder strap or a supporter, etc.

Referring to FIGS. 3 and 4, the detachable hand grip 140 includes a pad coupling portion 141 coupled to the pad main body 110, and a grip portion 143 coupled to the pad coupling portion 141 and gripped by a user with his/her hand.

That is, the pad coupling portion 141 is coupled to the hand grip placement portion 131a from which the corner finishing piece 115 of the pad main body 110 is separated, and the grip portion 143 is coupled to the pad coupling portion 141.

Here, as shown in FIGS. 3 and 4, the pad coupling portion 141 may include an inclined portion 142 inclined upward or downward at a predetermined angle with respect to the pad main body 110.

Through the inclined portion 142 formed in the pad coupling portion 141, grip feeling can be improved when the tablet PC 100 is used or carried. Also, when the pad coupling portion 141 formed with the inclined portion 142 is placed on the ground, the grip portion 143 maybe in contact with the ground and the detachable hand grip 140 may serve as a support for the tablet PC 100.

Here, the inclined portion 142 may have a straight or curved shape. Preferably, the inclined portion 142 has the curved shape in consideration of grip feeling or design, but not limited thereto.

Referring to (a) and (b) of FIG. 5, the detachable hand grip 140 may be provided with a length adjusting portion 144 for adjusting the length of the detachable hand grip 140 so as to couple with the different sides 113a, 113b, 113c and 113d of the pad main body 110.

The detachable hand grip 140 may be coupled to the pad main body 110 in the landscape direction, coupled to the pad main body 110 in the portrait direction, or coupled to the pad main body 110 in a diagonal direction.

Here, in consideration of the landscape direction and the portrait direction, if the landscape directional side and the portrait directional side of the pad main body 110 are different in length, a plurality of detachable hand grips have to be provided so as to be coupled in the landscape direction and the portrait direction, respectively.

However, the tablet PC 100 in this embodiment needs only one detachable hand grip 140 to be coupled in various directions of the pad main body 110 since the detachable hand grip 140 is provided with the length adjusting portion 144.

Here, the length adjusting portion 144 may have a corrugated structure as shown in (a) and (b) of FIG. 5.

That is, the detachable hand grip 140 is adjustable in length through the corrugated structure. Therefore, one detachable hand grip 140 adjustable in length is enough to couple with the pad main body 110 in various directions such as the landscape direction, the portrait direction, the diagonal direction, etc.

Figure 6:
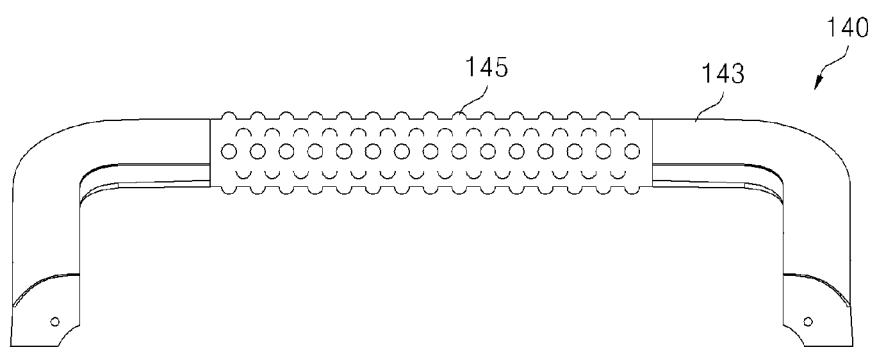
FIG. 6 is a view showing that an anti-slip portion is provided in the detachable hand in the tablet PC according to the first embodiment of the inventive concept.

Further, referring to FIG. 6, the detachable hand grip 140 may be provided with an anti-slip portion 145 for preventing slipping when a user grips it. Here, the anti-slip portion 145 may be formed with a plurality of projections or uneven patterns.

Meanwhile, referring to (a) and (b) of FIG. 7, the detachable hand grip 140 can be inserted inside the pad main body 110. Here, the detachable hand grip 140 can be inserted in and withdrawn from the pad main body 110 by pushing one side of the detachable hand grip 140 through a push-latch button 133.

Further, the fastening unit 130 may include a hand grip placement portion 131b, an elastic member (not shown) and a locking unit (not shown).

Here, the hand grip placement portion 131b may be formed inside the pad main body 110 so that at least a part of the detachable hand grip 140 can slide.

That is, referring to (a) and (b) of FIG. 7, the hand grip placement portion 131b is provided as an insertion hole inward formed at one side of the pad main body 110, so that a part of the detachable hand grip 140 can be inserted in the insertion hole and slide.

Further, the elastic member (not shown) is provided inside the pad main body 110 so as to contact the detachable hand grip 140, thereby elastically biasing the detachable hand grip 140 outward.

Here, the elastic member is placed inside the insertion hole, and returns to its original position by elasticity after the detachable hand grip 140 is inserted inside the insertion hole.

Also, the locking unit (not shown) is provided in the pad main body 110 and the detachable hand grip 140, and locks the detachable hand grip 140 to a predetermined position of the pad main body 110. The locked state of the locking unit can be released thereafter.

Hereinafter, operations and effects of the tablet PC 100 according to the first embodiment of the inventive concept will be described.

First, a user can use the tablet PC 100 on the way of moving, for example, in a subway, a bus, etc. In this case, the tablet PC 100 may be used as being disposed in the landscape direction or the portrait direction as necessary.

Here, in the tablet PC 100 according to the inventive concept, the detachable hand grip 140 is coupled to the pad main body 110 in the landscape direction or the portrait direction so that a user can easily grip the pad main body 110 regardless of whether its display is used in various environments, e.g., in the landscape direction or the portrait direction, thereby improving convenience in usage.

FIG. 8 is an exploded perspective view showing that a module installation unit and a detachable hand strap are all coupled to a pad main body in a tablet PC according to a second embodiment of the inventive concept.

Referring to FIG. 8, the detachable auxiliary device 120 in this embodiment is provided as a module installation strap 150 and coupled to the pad main body 110.

Hereinafter, repetitive descriptions will be avoided as necessary for convenience of description.

If the detachable auxiliary device 120 is coupled to the pad main body 110 by the fastening unit 130 and provided as the module installation strap 150 in which various modules having auxiliary functions are installed, the module installation strap 150 may include at least one of a magnetic stripe reader module 151 for reading information recorded in a magnetic stripe, a bar code reader module 152 for recognizing a bar code, an integrated circuit (IC) card module 153 for payment authentication or security-related authentication, and a preliminary battery module 154.

Here, the tablet PC 100 has an effect on that the magnetic stripe reader module, the bar code reader module, the IC card module, the preliminary battery module, etc. are combined to the tablet PC 100 to thereby use auxiliary functions such as physical distribution management, inventory control, payment, personal authentication, etc.

However, without limitation, the modules installed in the module installation strap 150 may include various modules having auxiliary functions.

Here, the magnetic stripe reader module 151 can read and process information recorded in a magnetic stripe, for example, information of a credit card, a check card, etc.

That is, if the magnetic stripe reader module 151 is installed in the module installation strap 150 and the module installation strap 150 is coupled to the pad main body 110, the tablet PC 100 may perform not only general operations through the pad main body 110 but also operations for industrial purpose, i.e., mobile payment, etc. through the module installation strap 150.

With this, the tablet PC 100 in this embodiment can perform not only main functions but also auxiliary functions based on the module installation strap 150.

Further, the bar code reader module 152 is a module configured to recognize a bar code marked on goods for payment or the like. If the bar code reader module 152 is installed in the module installation strap 150 and the module installation strap 150 is coupled to the pad main body 110, the pad main body 110 is used in payment for goods through the bar code recognition.

Also, the IC card module 153 is a module for not only payment authentication for goods but also security-related authentication through personal identification in a company, a workshop, etc. If the IC card module 153 is installed in the module installation strap 150 and the module installation strap 150 is coupled to the pad main body 110, the pad main body 110 is used in but payment authentication for goods but also security-related personal identification.

Further, the preliminary battery module 154 may be a replaceable battery preparing for a time when a main battery is completely discharged, or an auxiliary battery directly connected to the pad main body 110 and supplying electric power without replacing the main battery.

Meanwhile, referring to FIG. 8, the fastening unit 130 configured to fasten the module installation strap 150 to the pad main body 110 includes a module installation unit placement portion 134 provided on a rear wall of the pad main body 110, and a fastening member 132 fastening the module installation strap 150 to the module installation unit placement portion 134 of the pad main body 110.

Here, the fastening member 132 may be provided as a screw or a bolt so that the module installation strap 150 can be stably coupled to the module installation unit placement portion 134.

Meanwhile, the detachable auxiliary device 120 in this embodiment further includes a detachable hand strap 160.

That is, the detachable hand strap 160 is coupled to the back of the module installation strap 150 coupled to the rear wall of the pad main body 110.

Hereinafter, operations and effect of the tablet PC 100 will be described according to a second exemplary embodiment of the inventive concept.

First, if a user employs the tablet PC 100 for an industrial purpose, the module installation strap 150 in which various modules having auxiliary functions are installed may be coupled to the tablet PC 100.

Here, the foregoing modules may include the magnetic stripe reader module 151, the bar code reader module 152, the IC card module 153 and the preliminary battery module 154, or various modules having other auxiliary functions.

With this, it is possible to use auxiliary functions such as physical distribution management, inventory control, payment, personal authentication, etc.

Figure 10:
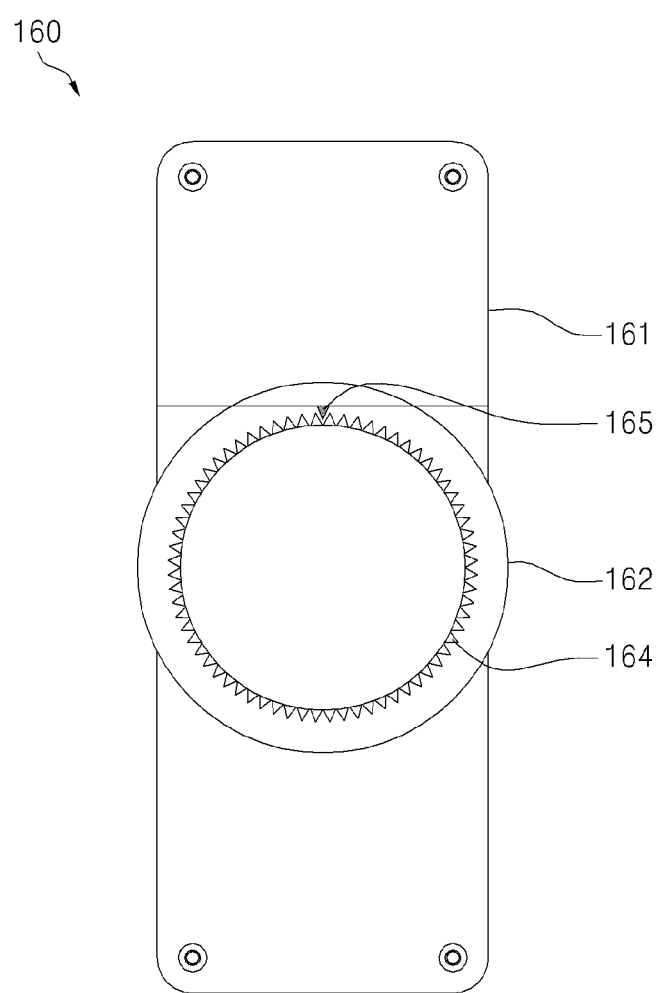
FIG. 10 is a cross-section view of the detachable hand strap in the tablet PC according to the third embodiment of the inventive concept.

FIG. 9 is an exploded perspective view showing that only a detachable hand strap is coupled to a pad main body in a tablet PC according to a third embodiment of the inventive concept, and FIG. 10 is a cross-section view of the detachable hand strap in the tablet PC according to the third embodiment of the inventive concept.

In this embodiment, the detachable auxiliary device 120 is provided as the detachable hand strap 160 and directly coupled to the pad main body 110.

Hereinafter, repetitive descriptions will be avoided as necessary for convenience of description.

Referring to FIG. 9, if the detachable auxiliary device 120 is provided as the detachable hand strap 160 so that the angle of the pad main body 110 can be changed while being gripped, a user grips a connection ring portion 163 of the detachable hand strap 160 placed on the rear wall of the pad main body 110 and then rotates the pad main body 110 relative to the detachable hand strap 160, thereby using the pad main body 110 at various angles or various directions in accordance with rotated positions.

Here, the detachable hand strap 160 includes a mounting portion 161 mounted to the pad main body 110, a rotary portion 162 coupled to the mounting portion 161 and rotatable at one side of the mounting portion 161, and the connection ring portion 163 coupled to the rotary portion 162 and gripped by a user.

Further, when the rotary portion 162 provided in the detachable hand strap 160 rotates, the pad main body 110 is also rotated relative to the rotary portion 162, and therefore the angle of the pad main body 110 is changeable with respect to the detachable hand strap 160.

Here, referring to FIG. 10, the rotary portion 162 has a circular section, and serrated protrusions 164 are arranged along the circular circumference of the rotary portion 162.

Further, the mounting portion 161 is formed with protrusion engaging portions 165 to be engaged with the serrated protrusions 164, so that the angle of the pad main body 110 in the gripped state is changed as the rotary portion 162 rotates.

That is, when the rotary portion 162 of the detachable hand strap 160 is rotated, the serrated protrusions 164 formed in the rotary portion 162 and the protrusion engaging portions 165 formed in the mounting portion 161 alternate between engaging and releasing within a preset range, so that a user can precisely adjust the angle of the pad main body 110 with respect to the detachable hand strap 160.

In the tablet PC 100 with this configuration according to an embodiment of the inventive concept, the angle of the pad main body can be changed while a user grips the tablet PC 100 as the detachable hand strap is coupled to the tablet PC 100, thereby having an effect on achieving optimum display under various usage environments such as a game, education, Internet surfing, industrial usage, etc.

Hereinafter, operations and effect of the tablet PC 100 will be described according to a third exemplary embodiment of the inventive concept.

First, when a user needs to use the pad main body 110 of the tablet PC 100 under various usage environments, the detachable hand strap 160 may be coupled to one side of the tablet PC 100.

Here, a user can precisely adjust the angle of the pad main body 110 with respect to the detachable hand strap 160 by rotating the rotary portion 162 of the detachable hand strap 160.

With this, it is possible to achieve the optimum display under various usage environments.

According to embodiments of the inventive concept, a tablet PC which additionally has an auxiliary function to be used for an industrial purpose, and is capable of properly coping with various usage environments through a detachable hand grip.

While the inventive concept has been particularly shown and described with reference to exemplary embodiments thereof, it will be understood that various changes in form and details may be made therein without departing from the spirit and scope of the following claims.

What is claimed is:

1. A tablet personal computer (PC) comprising:
a pad main body which comprises an input portion for inputting predetermined data, and an output portion for outputting results corresponding to input data;
a detachable auxiliary device which is detachably coupled to one side of the pad main body to assist functions of the pad main body; and
a fastening unit which is provided in the pad main body and fastens the detachable auxiliary device to the pad main body,
wherein the detachable auxiliary device comprises a detachable hand grip which is coupled to the pad main body with the fastening unit and gripped by a hand,
wherein the detachable hand grip comprises: a pad coupling portion which is coupled to the pad main body; and a grip portion which is coupled to the pad coupling portion and gripped by a user with his/her finger, and
wherein the pad coupling portion comprises an inclined portion inclined upward or downward at an angle previously determined with respect to the pad main body.

2. The tablet PC according to claim 1, wherein the detachable hand grip is coupled to at least one side of the pad main body.

3. The tablet PC according to claim 2, wherein the pad main body is shaped like a rectangular plate, and the detachable hand grip is coupled to two corners combined among four corners of the pad main body.

4. The tablet PC according to claim 1, wherein the inclined portion has a curved shape.

5. The tablet PC according to claim 1, wherein the detachable hand grip comprises a length adjusting portion for adjusting the length of the detachable hand grip to couple with different sides of the pad main body.

6. The tablet PC according to claim 5, wherein the length adjusting portion has a corrugated structure.

7. The tablet PC according to claim 1, wherein the detachable hand grip comprises an anti-slip portion for preventing slipping when gripped by a user.

8. The tablet PC according to claim 1, wherein the pad main body comprises at least one corner finishing piece detachably coupled to a corner, and
the fastening unit comprises: a hand grip placement portion provided by separating the corner finishing piece, and placing the detachable hand grip therein; and a fastening member fastening the detachable hand grip to the pad main body.

9. The tablet PC according to claim 1, wherein the fastening unit comprises:
a hand grip placement portion provided inside the pad main body so that at least a part of the detachable hand grip can slide;
an elastic member provided inside the pad main body and contacting the detachable hand grip so that the detachable hand grip can be elastically biased outward; and
a locking unit provided in the pad main body and the detachable hand grip so that the detachable hand grip can be locked at a predetermined position of the pad main body.

10. A tablet personal computer (PC) comprising:
a pad main body which comprises an input portion for inputting predetermined data, and an output portion for outputting results corresponding to input data
a detachable auxiliary device which is detachably coupled to one side of the pad main body to assist functions of the pad main body; and
a fastening unit which is provided in the pad main body and fastens the detachable auxiliary device to the pad main body,
wherein the detachable auxiliary device comprises a module installation unit coupled to the pad main body with the fastening unit and installed with at least one of a magnetic striped reader module for reading information recorded in a magnetic stripe, a bar code reader for recognizing a bar code, an integrated circuit (IC) card module for payment authentication or security-related authentication, and a preliminary battery module.

11. The tablet PC according to claim 10, wherein the fastening unit comprises
a module installation unit placement portion provided on a rear wall of the pad main body; and
a fastening member fastening the module installation unit to the module installation unit placement portion of the pad main body.

12. A tablet personal computer (PC) comprising:
a pad main body which comprises an input portion for inputting predetermined data, and an output portion for outputting results corresponding to input data
a detachable auxiliary device which is detachably coupled to one side of the pad main body to assist functions of the pad main body; and a fastening unit which is provided in the pad main body and fastens the detachable auxiliary device to the pad main body, wherein the detachable auxiliary device comprises a detachable hand strap changeable in an angle of the pad main body while being gripped.

13. The tablet PC according to claim 12, wherein the detachable hand strap comprises a mounting portion mounted to the pad main body;

a rotary portion coupled to the mounting portion and rotatable at one side of the mounting portion; and a connection ring portion coupled to the rotary portion and gripped by a user.

14. The tablet PC according to claim 13, wherein the rotary portion has a circular section, serrated protrusions are provided along a circular circumference of the rotary portion, the mounting portion comprises protrusion engaging portions to be engaged with the serrated protrusions, and an angle of the pad main body in a gripped state is changed by rotation of the rotary portion.

15. The tablet PC according to claim 12, wherein the detachable auxiliary device further comprises a module installation unit which is coupled to the pad main body by the fastening unit and in which at least one module is installed among a magnetic stripe reader module configured to read information recorded in a magnetic stripe, a bar code reader module configured to recognize a bar code, an integrated circuit (IC) card module for payment authentication or security-related authentication, and a preliminary battery module, and the detachable hand strap is coupled to the module installation unit.

* * * * *